Jan. 24, 1939. G. T. REICH 2,145,130
COOLING LIQUEFIED GASES
Filed June 12, 1936 3 Sheets-Sheet 3
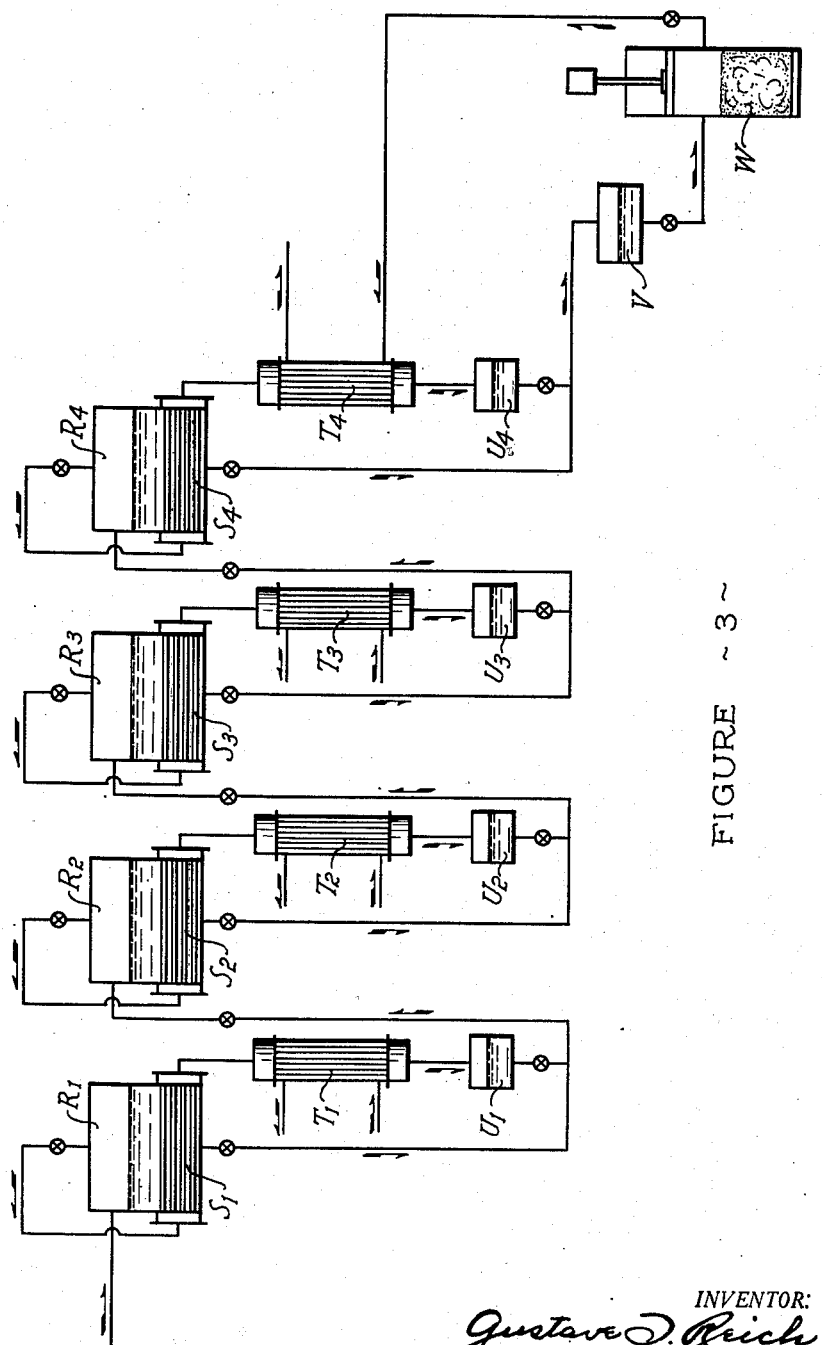
FIGURE - 3 -
INVENTOR:
Gustave T. Reich,
BY
Potter, Pierce & Scheffler.
ATTORNEYS.

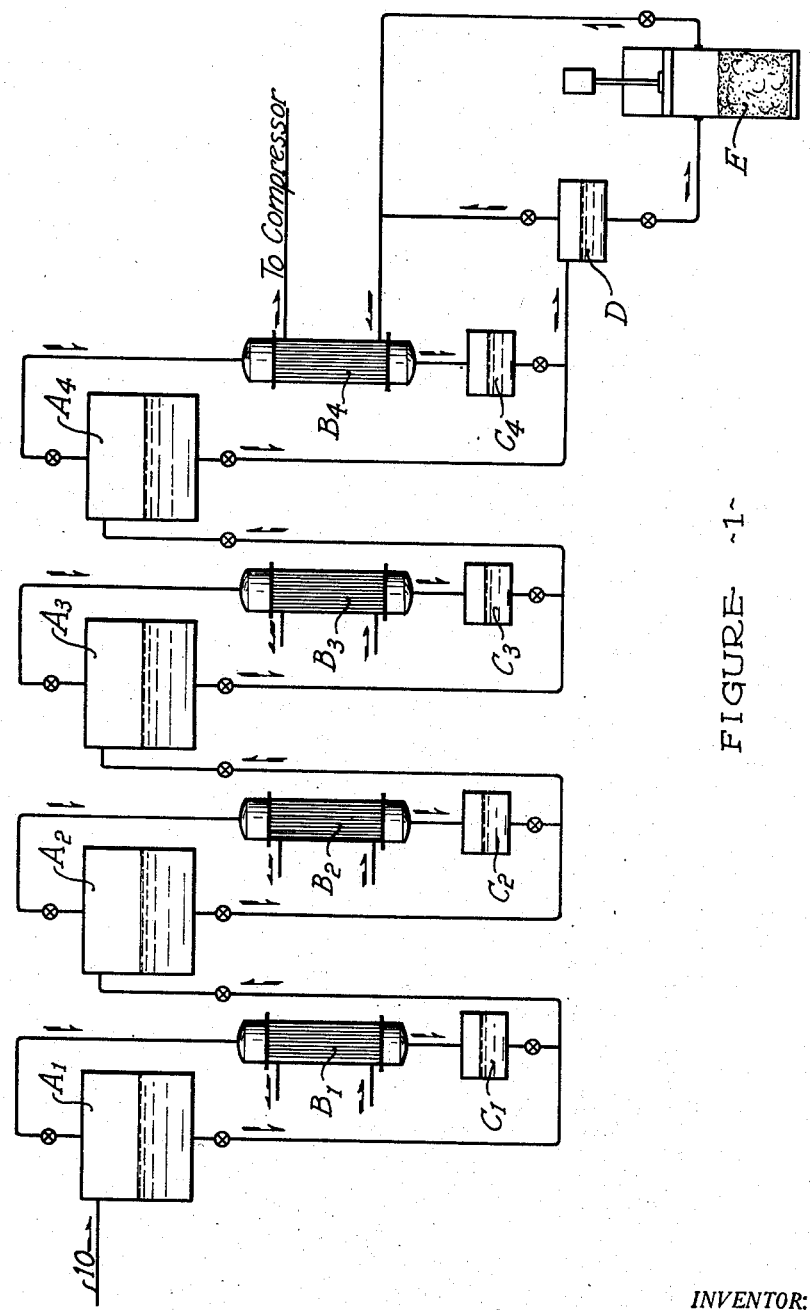
Jan. 24, 1939.  G. T. REICH  2,145,130
COOLING LIQUEFIED GASES
Filed June 12, 1936  3 Sheets-Sheet 1
FIGURE -1-
INVENTOR:
Gustave D. Reich,
BY
Potter, Pierce & Scheffler,
ATTORNEYS.

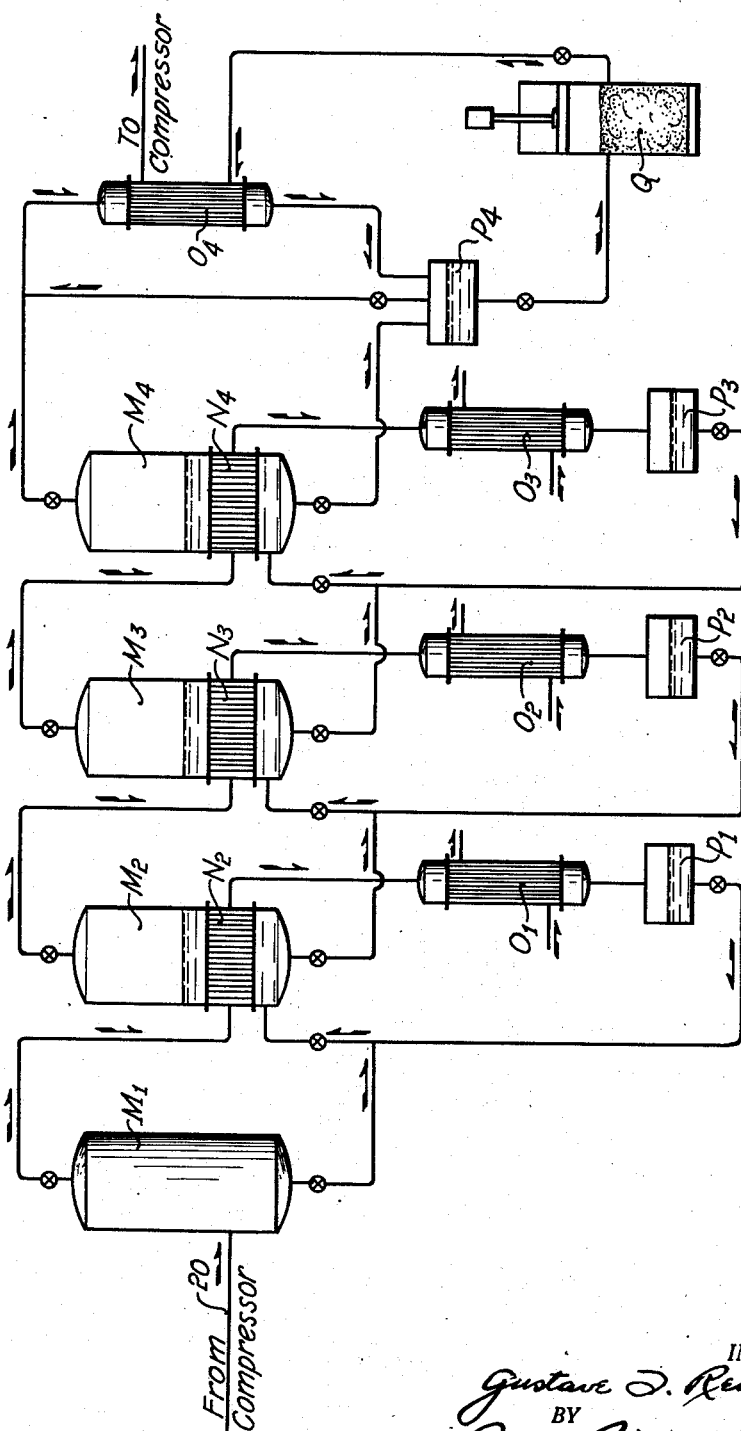

Patented Jan. 24, 1939

2,145,130

UNITED STATES PATENT OFFICE 2,145,130

COOLING LIQUEFIED GASES

Gustave T. Reich, Philadelphia, Pa.

Application June 12, 1936, Serial No. 84,957

10 Claims. (Cl. 62—175)

This invention relates to a method of and apparatus for cooling liquefied gases and particularly to the cooling of liquid carbon dioxide in the manufacture of solid carbon dioxide.

A principal object of the invention is the provision of a method and apparatus for the cooling of liquefied gases requiring a minimum of recompression and a minimum of external refrigeration.

A further object of the invention is the more economical production of solid carbon dioxide.

In general, the manufacture of solid carbon dioxide from gaseous carbon dioxide comprises compressing gaseous carbon dioxide to a high pressure; then converting the compressed gas into liquid carbon dioxide by cooling it below its critical temperature; cooling the liquid carbon dioxide by partial evaporation; and finally expanding the cooled liquid to form carbon dioxide snow and gas. The present invention is particularly directed to improving the operation of cooling the liquid prior to the snow-forming expansion operation.

In the processes heretofore proposed, the cooling of the liquid has been effected by partial evaporation of the liquid in one or more stages, in some processes in connection with external refrigeration. The cold carbon dioxide gases produced in the evaporation have been utilized for cooling, for example, by heat exchange with the liquid and thereafter returned to the compressors for recompression.

In general, starting with 1000 pounds of liquid carbon dioxide under 1000 pounds per square inch pressure as it is obtained from the compression and liquefaction operation, 550 pounds of liquid carbon dioxide at 5° F., and 300 pounds per square inch pressure is obtained by the evaporation of 450 pounds of the liquid to gas. Upon expanding the 550 pounds of liquid in the snow-producing operation about 275 pounds of solid and 275 pounds of gaseous carbon dioxide are formed. Thus out of every thousand pounds of liquid carbon dioxide produced by compression and liquefaction, 725 pounds are converted into gas in the cooling and solidifying operations. This means that over 70% of the power required for compression is consumed in the recompression of previously liquefied carbon dioxide.

The present invention makes it possible to reduce this recompression load to only 45 to 50% in that it permits the production of from 500 to 550 pounds of solid carbon dioxide from every 1000 pounds of liquid produced by the compression and liquefaction operations. This advantageous result is effected by the application of a novel method of cooling liquefied gases comprising subjecting the liquefied gas to a plurality of stages of partial evaporation by controlled expansion at successively lower temperatures, separating the gaseous portion from the liquid portion, reliquefying the gaseous portion by absorption of heat therefrom at constant pressure, and subjecting both the liquid portion and the reliquefied gaseous portion to the successive stage of evaporation.

In this manner the total amount of liquid carbon dioxide produced by the compression and liquefaction operations is supplied, at a much lower temperature, to the solidifying operation and the only carbon dioxide gas which is returned to the compression and liquefaction operations is that produced in the solidifying operation. This result is obtained by the method outlined above by carrying out the cooling of the liquid carbon dioxide in a plurality of evaporative cooling stages. In each stage the liquid is caused to evaporate under controlled pressure conditions. The gas and liquid portions produced in the evaporative stage are in equilibrium at lowered temperature and pressure conditions, which are such that substantially only the heat of liquefaction of the gaseous fraction needs to be removed in order to convert it into liquid at the same pressure. This reliquefied gaseous portion is then combined with the liquid portion and the combined portions are submitted to a further stage of evaporative cooling. The evaporative cooling is continued until the total amount of liquid received from the compression and liquefaction operations has been cooled to a suitable temperature for submitting it to the solidifying or snow-forming operation.

The invention will be more particularly described with reference to its use in the production of solid carbon dioxide, referring for the purpose of illustration to the accompanying drawings, in which:

Fig. 1 is a diagrammatic representation of a cooling system embodying the invention;

Fig. 2 is a diagrammatic representation of a modified embodiment of the invention; and Fig. 3 is a diagrammatic representation of a further embodiment of the invention.

In Fig. 1, $A_1$, $A_2$, $A_3$ and $A_4$ are flash tanks wherein the controlled adiabatic evaporation of liquefied gas is effected; $B_1$, $B_2$, $B_3$ and $B_4$ are heat exchangers wherein the evaporated portions of the gas from flash tanks $A_1$, $A_2$, $A_3$ and $A_4$, respectively, are liquefied; and $C_1$, $C_2$, $C_3$ and $C_4$ are receivers for the reliquefied gaseous portions from heat exchangers $B_1$, $B_2$, $B_3$ and $B_4$, respectively. D is a receiver for the final cooled liquefied gas and E represents apparatus wherein the cooled liquefied gas is utilized, for example, a "snow press" for the production of solidified carbon dioxide in cake form.

In a typical operation of the system shown in Fig. 1, liquid carbon dioxide at 84° F. and under 1017.7 pounds pressure (absolute) is supplied to flash tank $A_1$ at 10 from a conventional compressor and liquefier not shown.

In flash tank $A_1$ the liquid is evaporated adiabatically to a pressure of 831.6 pounds. This is effected by the evaporation of 26.3 percent of the liquid and cools both the liquid and gaseous portions to a temperature of 68° F. The gaseous portion at a pressure of 831.6 pounds and a temperature of 68° F. is very close to its liquefaction point and requires substantially only the removal of its latent heat of condensation to cause its reliquefaction. This is readily effected by means of cooling water, for example, heat exchanger $B_1$ and the liquefied product pass into receiver.

Both the original liquid portion from flash tank $A_1$ and the reliquefied gaseous portion from heat exchanger $B_1$ are now subject to a further evaporative cooling operation, preferably although not necessarily, after recombining the portions as indicated in Fig. 1. In the next flash tank $A_2$, 15.5 percent of the liquid is evaporated, giving liquid and gaseous portions at a temperature of 50° F. and a pressure of 653.6 pounds. Again the liquid portion is readily reliquefied in heat exchanger $B_2$ by ordinary cooling water.

The liquid is then subjected to a third adiabatic evaporative cooling operation in flash tank $A_3$ wherein 13.8% of the liquid is evaporated giving liquid and gaseous portions at 476.3 pounds pressure and 28° F. The gaseous portion is again reliquefied in heat exchanger $B_3$ and the liquid subjected to a fourth evaporative cooling in flash tank $A_4$ wherein the evaporation of 13.4 percent of the liquid gives gaseous and liquid portions at 295.6 pounds pressure and —2° F. The gaseous portion is liquefied in heat exchanger $B_4$ and the original amount of liquid is now available at a temperature of —2° F. and a pressure of 295.6 pounds. If it is allowed to expand to a pressure of about 50 pounds absolute in a snow-forming apparatus E, there is formed about 50.5 percent of solid carbon dioxide and about 49.5 percent of gaseous carbon dioxide at a temperature of —80° F. This is amply sufficient to effect the reliquefaction in heat exchanger $B_4$ of the gaseous fraction from the flash tank $A_4$.

The gaseous fraction from flash tank $A_3$ requires the removal of heat at a temperature of about 28° F. This may be effected by means of the residual cooling capacity of the gas from the solidifying operation as it comes from heat exchanger $B_4$ or this cooling may be effected by means of a refrigerant supplied, for example, from an independent refrigerating system.

It will, of course, be understood that the specific proportions, pressures and temperatures given in the foregoing description are merely illustrative of the invention; that various liquefied gases may be cooled by the described method; and that a greater or smaller number of evaporative cooling stages may be utilized.

In embodiment of the invention illustrated in Fig. 2 the reliquefaction of the gaseous portions from the evaporative cooling stages is effected, at least in part, by indirect heat exchange with the evaporating liquid in the succeeding evaporative cooling stage. In this figure $M_1$, $M_2$, $M_3$ and $M_4$ represent flash tanks. In the lower portions of flash tanks $M_2$, $M_3$ and $M_4$ are provided heat exchangers $N_2$, $N_3$ and $N_4$, respectively, which may be similar to the calandrias or steam chests of a conventional evaporator. $O_1$, $O_2$, $O_3$ and $O_4$ are heat exchangers, wherein the liquefaction of the gases from flash tanks $M_1$, $M_2$, $M_3$ and $M_4$, respectively, is completed. $P_1$, $P_2$ and $P_3$ are receivers for the reliquefied gaseous portion from flash tanks $M_1$, $M_2$ and $M_3$, respectively. $P_4$ is a receiver for the combined liquid portion and reliquefied gaseous portion from flash tank $M_4$. Q represents apparatus for the utilization of the cooled liquefied gas, for example, apparatus for the production of solid carbon dioxide.

In the utilization of this form of the invention for the production of solid carbon dioxide, liquid carbon dioxide from a conventional compression and liquefaction system not shown is supplied to flash tank $M_1$ at 20. The gaseous portion is passed through the heat exchanger $N_2$ in indirect contact with the evaporating liquid in flash tank $M_2$ and then through heat exchanger $O_1$. The reliquefied gaseous portion is then combined with the liquid portion from flash tank $M_1$ and passed into flash tank $M_2$ and so on through the system. The gaseous portion from the last flash tank in the system is advantageously brought into heat exchange with the cold gas from the snow-forming operation in heat exchanger $O_4$.

The pressure and temperature conditions in the various stages are controlled either manually or automatically by means of valves provided, as shown in the figures, between the various elements of the system and may advantageously be the same as those given by way of example in the description of Fig. 1. In this example, it will be noted that the pressure drop is approximately the same in each stage of evaporative cooling, roughly about 180 pounds. This is an advantageous method of operation but the pressure drop in the various stages may be regulated so as to give, for example, a uniform drop in temperature, or a uniform amount of evaporation in each stage. The conditions given in the examples have the advantage that the amount of gas evaporated continually decreases in the succeeding stage so that there is a very substantial decrease in the amount of gas to be reliquefied at the lower temperatures with a resultant economy in the lowered requirement for low temperature refrigeration.

In the form of the invention shown in Fig. 3 the evaporation of the liquefied gas is effected in flash tanks $R_1$, $R_2$, $R_3$ and $R_4$ provided with heat exchangers $S_1$, $S_2$, $S_3$ and $S_4$ as in Fig. 2. In order to equalize more fully the temperatures of the gaseous and liquid portions of each stage of evaporation the gaseous portions are passed through the heat exchangers in contact with the evaporating liquid in the same stage before passing to heat exchangers $T_1$, $T_2$, $T_3$ and $T_4$ where the gaseous portions are reliquefied as in the other figures. $U_1$, $U_2$, $U_3$ and $U_4$ are receivers for the reliquefied portions. V is a receiver for the supercooled liquid and W is an apparatus for utilizing the supercooled gas.

It will be seen that the invention provides methods and apparatus for the cooling of liquefied gases to a low temperature without the requirement of energy for the recompression of evaported gas and with a very low refrigeration requirement and more particularly that it provides methods and apparatus whereby solid carbon dioxide may be produced with much lower compression costs than in the methods now available.

I claim:

1. A method of cooling liquefied gases which comprises subjecting a liquefied gas to partial evaporation, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature.

2. A method of cooling liquefied gases which comprises subjecting a liquefied gas to partial evaporation by adiabatic expansion, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature.

3. A method of cooling liquefied gases which comprises subjecting a liquefied gas to partial evaporation, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature, the gaseous portion from at least one stage of evaporation other than the stage of evaporation effected at lowest temperature being reliquefied at least in part by heat exchange with a stage of evaporation effected at a lower temperature than the temperature at which said gaseous portion is evaporated.

4. A method of cooling liquefied gases which comprises subjecting a liquefied gas to partial evaporation, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature, the proportion of the liquid evaporated in each successive stage being regulated to maintain a substantially equal pressure drop in each stage.

5. In the production of solid carbon dioxide the improvement in the cooling of liquid carbon dioxide which comprises subjecting the liquid carbon dioxide to partial evaporation, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature.

6. In the production of solid carbon dioxide the improvement in the cooling of liquid carbon dioxide which comprises subjecting the liquid carbon dioxide to partial evaporation by adiabatic expansion, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature.

7. In the production of solid carbon dioxide the improvement in the cooling of liquid carbon dioxide which comprises subjecting the liquid carbon dioxide to partial evaporation, reliquefying the gaseous portion thereby produced by absorption of heat therefrom at substantially the pressure of evaporation, and submitting the liquid portion and the reliquefied gaseous portion to further similar stages of partial evaporation and reliquefaction at successively lower temperatures until the whole of the liquefied gas is reduced to the desired temperature, the amount, temperature and pressure of the last stage of evaporation being so regulated that it may be reliquefied by heat exchange with the gaseous carbon dioxide produced in the solidifying operation.

8. Apparatus for cooling liquefied gases comprising a plurality of evaporators connected in series for the passage of liquid effluent from all but the last evaporator in the series into the next succeeding evaporator in the series, heat exchange means for reliquefying the gaseous effluent from each of said evaporators, means for the passage of the reliquefied gaseous effluent from all but the last evaporator in the series into the next succeeding evaporator in the series, and means for supplying a liquefied gas into the first evaporator in the series.

9. Apparatus for cooling liquefied gases comprising a plurality of evaporators connected in series for the passage of liquid effluent from all but the last evaporator in the series into the next succeeding evaporator in the series, heat exchange means for reliquefying the gaseous effluent from each of said evaporators, means for the passage of the reliquefied gaseous effluent from all but the last evaporator in the series into the next succeeding evaporator in the series, means for supplying a liquefied gas into the first evaporator in the series, and means for controlling the pressure in each of said evaporators.

10. Apparatus for cooling liquefied gases comprising a plurality of evaporators connected in series for the passage of liquid effluent from all but the last evaporator in the series into the next succeeding evaporator in the series, heat exchange means for reliquefying the gaseous effluent from each of said evaporators, means for the passage of the reliquefied gaseous effluent from all but the last evaporator in the series into the next succeeding evaporator in the series, and means for supplying a liquefied gas into the first evaporator in the series, at least one of said heat exchange means being in heat exchange relationship with the evaporator to which the reliquefied gaseous effluent is being passed.

GUSTAVE T. REICH.